US011399211B2

(12) United States Patent
Killick et al.

(10) Patent No.: US 11,399,211 B2
(45) Date of Patent: Jul. 26, 2022

(54) ENHANCED NETWORK RESOURCE MANAGEMENT

(71) Applicant: Cox Communications, Inc., Atlanta, GA (US)

(72) Inventors: Ray Killick, Atlanta, GA (US); Ramkumar Krishnan, Atlanta, GA (US); Jayasri Devalapalli, Atlanta, GA (US); Muhammad Raza, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 0 days.

(21) Appl. No.: 17/083,085

(22) Filed: Oct. 28, 2020

(65) Prior Publication Data
US 2022/0132206 A1 Apr. 28, 2022

(51) Int. Cl.
*H04N 21/442* (2011.01)
*H04N 21/61* (2011.01)
*H04N 21/45* (2011.01)
*G06N 20/00* (2019.01)
*H04N 21/438* (2011.01)
*G06Q 30/02* (2012.01)
*H04N 21/81* (2011.01)

(52) U.S. Cl.
CPC ....... *H04N 21/44209* (2013.01); *G06N 20/00* (2019.01); *G06Q 30/0205* (2013.01); *G06Q 30/0264* (2013.01); *H04N 21/4383* (2013.01); *H04N 21/4524* (2013.01); *H04N 21/6118* (2013.01); *H04N 21/812* (2013.01)

(58) Field of Classification Search
CPC ............................................... H04N 21/44209
See application file for complete search history.

(56) References Cited

U.S. PATENT DOCUMENTS

| 9,674,567 | B1* | 6/2017 | Carter ................. H04N 21/812 |
| 2014/0040947 | A1* | 2/2014 | Haberman ......... H04N 21/2668 |
| | | | 725/34 |
| 2018/0131975 | A1* | 5/2018 | Badawiyeh ...... H04N 21/23614 |

\* cited by examiner

*Primary Examiner* — Michael H Hong
(74) *Attorney, Agent, or Firm* — Eversheds Sutherland (US) LLP

(57) ABSTRACT

This disclosure describes systems, methods, and devices related to network resource management and content delivery. A method may include a first device determining a first bandwidth demand associated with a second device sending a first addressable advertisement using a data over cable service interface specification (DOCSIS) bandwidth using a first advertisement spot for a first linear segment addressability (LSA) television channel, and determining a second bandwidth demand associated with the second device sending a second addressable advertisement using the DOCSIS bandwidth for presentation using a second advertisement spot. The method may include determining that the first bandwidth demand is below a threshold bandwidth, and determining that the second bandwidth demand exceeds the threshold bandwidth. The method may include sending a reference to the first addressable advertisement over the DOCSIS bandwidth for presentation using the first advertisement spot and, and determining a recommendation associated with presentation of the second addressable advertisement.

20 Claims, 8 Drawing Sheets

US 11,399,211 B2

ENHANCED NETWORK RESOURCE MANAGEMENT

TECHNICAL FIELD

This disclosure generally relates to devices, systems, and methods for network resource management.

BACKGROUND

In linear broadcasting, advertisements may be presented to viewers during certain times of broadcasted programs. During advertisement times of different broadcasted programs, advertisements may be provided to the devices used to present the broadcasted programs and the advertisements, resulting in multiple concurrent streams of advertisements that require more resources than may be available at a given time. Therefore, enhanced network resource management is needed.

Figure 1:
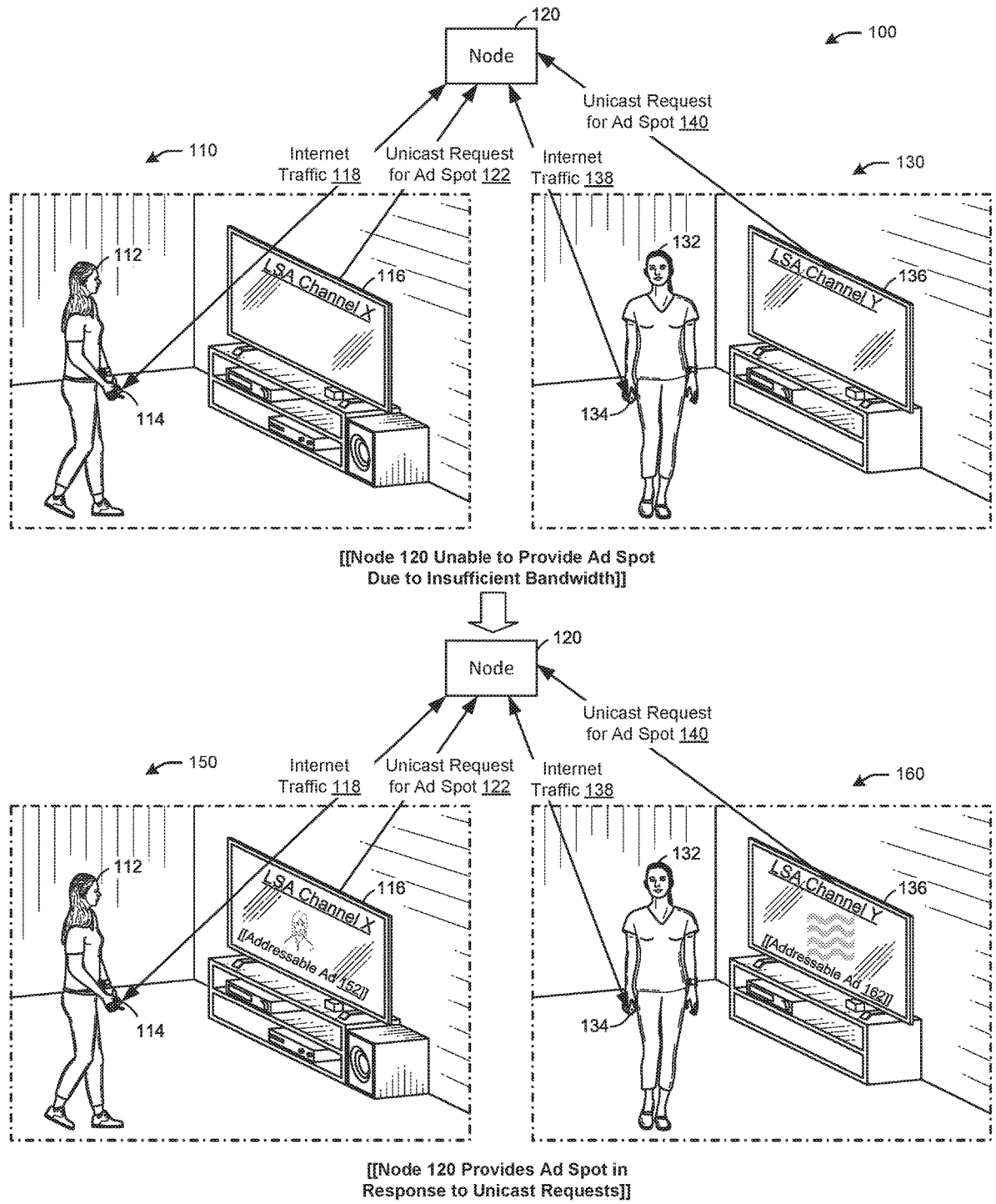
FIG. 1 illustrates an example system for network resource management, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Example embodiments described herein provide certain systems, methods, and devices for network resource management and content delivery. The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

In linear broadcasting, viewers tune to a channel to watch televised programming. The programming may be presented during certain times, with advertisement intervals scheduled during breaks in the programming. Linear segment addressability (LSA) channels allow for addressability of content, such as advertisements in targeted advertisement campaigns. In contrast with broadcast advertisements provided to all customer playback devices watching a television channel (e.g., a viewing audience), some targeted advertisements may be addressed to a subset of devices in the audience (e.g., the active devices tuned to the channel) during an advertisement interval (e.g., commercial break) of a program presented by the devices using (e.g., tuned to) a LSA channel. Unlike non-LSA channels, however, LSA channels allow for addressable "spots," which refer to portions of an advertisement break (or slot) during which different audiences may be presented different (e.g., targeted) advertisements. In particular, advertisements may be provided to a particular device (e.g., addressed to the particular device) or group of devices associated with an audience, each device using its own unicast stream, allowing for different advertisements to be presented to different viewers (e.g., of a same LSA channel) at the same time. In this manner, LSA channels allow for targeted television advertising. Instead of all viewers of a television channel receiving the same advertisement content during a same commercial break, LSA channels allow for different audiences of the same LSA channel to receive different advertisement content during the same commercial break. Commercial breaks may have dedicated times for non-addressable (e.g., broadcast) advertisements sent to all viewers' devices during presentation of a broadcast program (e.g., a national advertisement for all program viewers), and LSA channels also may have dedicated times during commercial breaks to allow for presentation of addressable advertisements. In this manner, two viewers of the same LSA channel at the same time may be presented different advertisements.

To facilitate the presentation of addressable advertisement spots using LSA channels, devices that present addressable advertisement spots may switch between operating modes at designated times. In particular, devices that present LSA channel content may operate using a broadcast mode when presenting non-addressable advertisement spots (e.g., broadcast advertisement spots). The broadcast mode does not allow for addressable advertisement spots, however, as addressable advertisement spots may require the use of unicast requests that are unique to individual playback devices. When a device identifies a scheduled addressable advertisement spot, the device may switch from a broadcast mode to a unicast mode. In particular, because an addressable advertisement is not considered part of the linear broadcast (e.g., the addressable advertisement is not the same advertisement sent to all viewers' devices), the device may switch to a unicast mode to allow for addressable advertisement spots to present targeted advertisements when tuned to a LSA channel. In this manner, a linear broadcast includes breaks in between linear broadcast content provided to all viewers, and during the commercial breaks, devices may present customized advertisement content facilitated by a unicast mode.

However, not all addressable advertisement spots for different LSA channels occur at the same time, so different playback devices may switch to unicast mode and may send unicast requests (e.g., to advertisement servers) for addressable advertisement spots at different times. For example, several seconds before a scheduled addressable advertisement spot, a device may identify a descriptor indicating the upcoming scheduled addressable advertisement spot. In response, the device may switch to a unicast mode and may send a unicast request for advertisements to be provided for presentation during the scheduled addressable advertisement spot. When multiple active viewers of one or multiple audiences during an advertisement slot send individual unicast requests for addressable advertisements, each unicast request requiring an individual stream per active viewer of an audience, the result may be a significant number of streams (e.g., demand) for the delivery of targeted advertisements. In this manner, bandwidth demand for any node (e.g., providing service to multiple viewers) may increase during times allocated for addressable content.

In particular, addressable advertisements may be provided to unicast requesting devices using downstream bandwidth as defined by the Data Over Cable Service Interface Specification (DOCSIS) technical standards. The downstream DOCSIS bandwidth used to deliver unicast advertisements may be the same bandwidth used to provide Internet service traffic. In this manner, targeted advertisements presented using LSA television channels may share bandwidth with Internet service, and the result may be insufficient bandwidth to provide both targeted advertisements for LSA television channels when multiple unicast requests for addressable advertisements are responded to by providing advertisements over the downstream bandwidth. For example, the DOCSIS bandwidth may be fixed. At a given node that may service a significant number of viewers (e.g., customer premises equipment used to present content), when the customer equipment at a node and requesting addressable advertisements provide a high volume of unicast requests for addressable advertisements, the bandwidth used to deliver content to the customer equipment connected to the node may be insufficient to meet the bandwidth demand (e.g., the bandwidth demand at the node may be considered high). In this manner, when a customer playback device identifies a time to receive addressable advertisements during a broadcast television program using a LSA television channel, the customer playback device may leave a modulated cable television LSA channel used to provide cable television broadcast content, and may request an addressable advertisement to be provided to the customer playback device using a DOCSIS channel. Because of the use of DOCSIS to provide an advertisement to be displayed during an advertisement break during a television broadcast, bandwidth demand for DOCSIS channels may become an issue that may be alleviated by segmenting viewing audiences as described herein.

When a viewer selects LSA channels for presentation, the viewer may see the same addressable advertisement regardless of which channel the viewer is watching at a given time. In particular, when advertisement spots are aligned on different LSA channels, a viewer may switch from a first channel to a second channel and may see the same addressable advertisement on the second channel that the viewer would have seen on the first channel. Because of the advertisement spot alignment across multiple different channels, the result may be many unicast requests from different devices requesting addressable advertisements at the same time. In contrast, when different LSA channels begin addressable advertisement spots at different times during advertisement slots, less bandwidth may be required at a given time to provide the respective addressable advertisements to the devices presenting the different respective LSA channels because the different advertisements may be sent at different times according to the beginning of the different advertisement spots. In this manner, unaligned addressable advertisement spots of different LSA channels may result in less bandwidth use at a given time. However, not all addressable advertisement spots on different LSA channels may avoid being aligned with one another, and not all unaligned addressable advertisement spots may result in sufficient bandwidth available to provide multiple addressable advertisement streams.

There is therefore a need for enhanced network resource management and content delivery.

In one or more embodiments, a system may determine which portions (e.g., spots) of an advertising slot to allocate to a LSA channel for addressable advertisements. For example, in an advertising slot that includes time for national broadcast advertisements and time for local advertisements, the system may allocate a first portion of the time for local advertisements to present addressable advertisements to one LSA channel, and may allocate a second portion of the time for local advertisements to present addressable advertisement to another LSA channel. Continuing the example of the MSNBC and Fox News LSA channels, for a minute of local advertising scheduled at the same time for both MSNBC and Fox News, the system may select the first thirty seconds of the local advertisement time for presentation of addressable advertisements on MSNBC, and may select the last thirty seconds of the local advertisement time for presentation of addressable advertisements on Fox News. In this manner, the system may avoid overlapping addressable advertisement spots on some LSA channels. To reduce bandwidth usage, the system may avoid scheduling multiple overlapping addressable advertisements to send to a node using DOCSIS bandwidth, especially for LSA channels with significant viewership during a particular day part. As a result, playback devices tuned to Fox News may not send unicast requests to the system at the same time as playback devices tuned to MSNBC, allowing the system to reduce the number of unicast requests to process at one time, and corresponding addressable advertisement responses sent at one time. However, having different addressable advertisement times allocated to different channels may not always occur, so to address situations when some LSA channels have overlapping addressable advertisement times, the system may evaluate audience segments as described below.

In one or more embodiments, the system may evaluate viewership patterns of audience segments at a node to predict whether the bandwidth needed to deliver addressable advertisements for LSA channel programming may be sufficient at given times. For example, of one hundred user devices connected to a node (e.g., a viewing audience of one hundred), forty of the user devices at a particular time may be predicted to be active viewers (e.g., based on the number of user devices tuned to LSA channels at the particular time). In this manner, an audience of one hundred people may result in forty targeted viewers (or user devices) at the particular time. Based on evaluations of viewership patterns of audience segments at different times of day (e.g., "day parts"), the system may determine viewing scores for audience segments at a respective time, and may manage the scheduled delivery of addressable content based on the viewing scores. For example, a higher viewing score may indicate a higher likelihood (e.g., probability) that an audience segment is to watch addressable content at a given time that corresponds to the viewing score (e.g., a viewing score of an audience segment for the time period 8-9 PM may be greater than a viewing score of the audience segment for the time period of 9-10 PM on the same day). When the viewing score of an audience segment (e.g., a portion of an audience whose playback devices are predicted to present the LSA channel at a given time) exceeds a threshold score, the audience segment may be considered an active audience. In this manner, not all devices connected to a node that present the LSA channel actually may be tuned to the LSA channel at the given time, so the number of devices connected to the node and that is predicted to be active at the given time may be less than the total number of devices considered as the viewing audience for the LSA channel. In this manner, by predicting whether the active viewing audience (e.g., sub-segment of an overall viewing audience) for the LSA channel at the given time will result in a number of unicast requests and corresponding DOCSIS streams for targeted advertisements, the system may determine whether the DOCSIS bandwidth needed for the streams will exceed the amount of bandwidth predicted to be available. For example, when the active audience of ten devices requests a targeted advertisement that uses five Mbps of bandwidth, the bandwidth demand for the corresponding ten streams is ten devices times five Mbps, or 50 Mbps. When the bandwidth demand and any demand associated with Internet service use is below a bandwidth threshold, the predicted active viewing audience may be approved to request the targeted advertisement. When the bandwidth demand and any demand associated with Internet service use exceeds the bandwidth threshold, other actions may be taken as described further herein.

In one or more embodiments, the system may identify common customers across different audience segments. For example, a household identified as part of two different audience segments for day part (e.g., an MSNBC audience segment and a Fox News audience segment) may be considered one rather than multiple customers. In this manner, the system may break down audience segments into day parts, and determine the day parts during which to deliver ad campaigns to different sub-groups of audience segments at different times. For example, a MSNBC audience segment during a day part of 6-7 PM may include fifty viewers, and a Fox News audience segment during the 6-7 PM day part may include fifty viewers. Of the one hundred viewers during the 6-7 PM day part, twenty of the viewers may be in both the Fox News audience segment and in the MSNBC audience segment. Therefore, only thirty viewers may be in the MSNBC audience segment and not in the Fox News audience segment, and only thirty viewers may be in the Fox News audience segment and not in the MSNBC audience segment. The result may be the two groups of thirty viewers in one respective audience segment, and the group of twenty viewers in both audience segments. When a group is large enough, the group may receive a targeted addressed advertisement campaign.

In one or more embodiments, the system may predict whether a spike in Internet traffic is likely to occur during an addressable advertisement campaign, thereby creating a risk of bandwidth shortage to deliver both television advertisements and Internet traffic using the same DOCSIS bandwidth. When the spike of Internet traffic (e.g., an amount of Internet traffic exceeds a threshold amount of traffic) overlaps an addressable advertisement campaign spot, the system may adjust criteria to limit the number of addressable advertisement campaigns that may be provided using DOCSIS bandwidth during that time (e.g., by requiring a larger threshold number of viewers in a targeted group for addressable advertisements). When the Internet traffic is not projected to exceed the threshold amount (e.g., no spike in traffic), the system may adjust criteria to allow for more addressable advertisement campaigns that may be provided using DOCSIS bandwidth during that time (e.g., by requiring a smaller threshold number of viewers in a targeted group for addressable advertisements). The system may use a machine learning model to project DOCSIS bandwidth usage for television and/or Internet services at a particular time (e.g., corresponding to a portion of an ad slot reserved for addressable advertisements), and may update the machine learning model based on whether predicted bandwidth usage was accurate.

In one or more embodiments, the system may maintain a programming schedule that indicates the timing of programming and advertisement slots for LSA channels, including the specific times for broadcast advertisements and for addressable advertisements. When a playback device (e.g., a cable box) identifies an upcoming spot for addressable advertisements during an advertising slot, the playback device may send a unicast request to the system. The unicast request may include an identifier of the playback device, such as a medium access control (MAC) address. Based on the identifier of the playback device, the system may determine which audience group(s) the playback device represents (e.g., based on data indicating when the device is presenting programming, which programming is being presented, viewer preferences, and the like). For any audience group, the system may determine and provide to unicast requesting playback devices references to advertisements. The playback devices may receive the reference and send requests (e.g., to a content delivery network) for the referenced advertisements. The content delivery network may receive the requests for referenced advertisements and may generate and send the advertisement campaign to the target audiences at a node with one or more identifiers that identify the specific playback devices to which to deliver the addressable advertisement campaign. The addressable advertisements requested may be provided using streams of DOCSIS channels, which may be limited by bandwidth for customers using a node.

In one or more embodiments, the system may evaluate viewership patterns of audience segments of a node during different day parts. For example, the system may determine that one audience segment is to be targeted during one day part than another day part (e.g., the audience segment may be larger at one day part than another, and the larger day part audience segment may be better to target because more viewers are likely to see an addressable advertisement). By identifying common customers among different audience segments during a day part, the system may allow for use of an addressable advertisement campaign that otherwise may not be presented, and may result in increased advertisement impressions. For example, when three audiences of 100 viewers per audience have 30 overlapping viewers between a first audience and a second audience, 30 overlapping viewers between the second audience and a third audience, thirty overlapping viewers between the first audience and the third audience, and ten viewers who overlap in all three audiences, the ten viewers who overlap in all three audiences may not be added to a cumulative audience size, the viewers that overlap two of the three audiences may partially contribute to the cumulative audience size, and the viewers only in one audience may contribute to the cumulative audience size. By using audience spot division multiplexing (ASDM), the system may multiplex audience members across multiple audiences, which may allow for larger audience sizes without requiring more DOCSIS bandwidth than is available to provide addressable advertisements.

In one or more embodiments, the system may identify slot dates for any ad campaign. The system receives ad campaigns from a content provider, and based on the flight dates for a campaign, may identify the audiences available at different day parts during the flight dates. The system may determine whether the likelihood (e.g., probability) of a campaign being viewed by a threshold number of viewers exceeds a probability threshold. The system may identify audience segments having overlapping times, and may predict bandwidth needed to provide ad campaigns and Internet service using DOCSIS bandwidth at any time. Based on bandwidth need and common customers identified among multiple audience segments, the system may determine and provide to requesting customer equipment references to advertisements that the customer equipment may include in requests for targeted advertisements.

In one or more embodiments, the system may determine an audience segment for a node, and may determine viewership for the audience segment (e.g., may rank audience members based on the viewing score during a day part). The system may determine the LSA channels that the audience members of the audience segment watch the most. Based on the most-watched LSA channels for given audience members, the system may determine advertisement spot alignments (e.g., aligned times for addressable advertisements during advertisement slots for the ad campaigns on the LSA channels). Using audience spot division multiplexing (ASDM), the system may consider multiple members who watch different unaligned LSA channels as needing only one ad stream as described above (e.g., the members may be one customer who watches different LSA channels). Based on the number of streams needed to deliver ad campaigns to a node using DOCSIS bandwidth, the system may determine the expected downstream DOCSIS bandwidth needed. When the needed audience bandwidth is below a threshold bandwidth, the system may "pass" or "confirm" the audience and allow for the ad campaigns to target an audience of customer devices serviced by a node. When the needed audience bandwidth exceeds the threshold bandwidth, the system may apply a bandwidth dial-up knob (BDK) to allow for a higher bandwidth threshold (e.g., 20% higher, or another number). When the needed audience bandwidth exceeds the increased (e.g., dialed up) threshold bandwidth, the system may pass or confirm the audience to request unicast streams for targeted advertisements. Otherwise, the system may reduce audience size based on viewership rank until the size of an audience falls below the increased threshold bandwidth. The BDK may be employed when Internet traffic is predicted to be below a traffic threshold (e.g., based on previous usage at a node during a day part). When an audience is passed or confirmed, the system may determine the best option to achieve ad impression goals by splitting the audience segment across multiple day parts based on viewership patterns (e.g., determining day parts during which the audience segment size is largest). To reduce the audience size, the system may allow for use of a day part during which the audience segment size is not the largest to deliver an ad campaign, or may further analyze the audience to break down the audience into smaller segments and day parts (e.g., smaller durations of time). In some occasions, when an audience contributes to bandwidth usage that exceeds the threshold bandwidth and cannot be broken down into a smaller size needing bandwidth below the threshold bandwidth, the system may reject an audience. An audience at a node may be part of a larger available audience, and may be removed from the larger available audience to decrease the audience size (and corresponding bandwidth demand), thereby allowing an advertisement campaign to proceed.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 illustrates an example system 100 for network resource management, in accordance with one or more example embodiments of the present disclosure.

Referring to FIG. 1, the system 100 may include, at step 110, a viewer 112 with a device 114, the viewer 112 watching LSA channel X using device 116. The device 114 may send and/or receive Internet traffic 118 through a node 120 (e.g., fiber optic node, amplifier, splitter, coupler, tap device, or other device). The device 116 may identify an upcoming addressable advertisement spot, may switch from a broadcast mode to a unicast mode, and may send a unicast request 122 for advertising content (e.g., a request for one or more addressable advertisements during an advertisement spot) to the node 120. At step 130, a viewer 132 with a device 134 may be watching LSA channel Y using device 136. The device 134 may send and/or receive Internet traffic 138 through the node 120. The device 136 may identify an upcoming addressable advertisement spot, may switch from a broadcast mode to a unicast mode, and may send a unicast request 140 for advertising content (e.g., a request for one or more addressable advertisements during an advertisement spot) to the node 120. Because the unicast request 122 and the unicast request 140 may result in demand for multiple addressable advertisement streams (e.g., a first addressable advertisement stream to send a first addressable advertisement to the device 116 using the node 120, and a second addressable advertisement stream to send a second addressable advertisement to the device 136 using the node 120) at the same time, the bandwidth (e.g., DOCSIS downstream bandwidth) needed to deliver the addressable advertisement streams and the Internet traffic 118 and 138 may exceed the available bandwidth, resulting in a lack of addressable advertising content being provided to and presented by the devices 116 and 136.

Still referring to FIG. 1, the system 100 may avoid the bandwidth demand issue of steps 110 and 130 by using enhanced network resource management. At step 150, the device 116 may send the unicast request 122 to the node 120, and at step 160, the device 136 may send the unicast request 140 to the node 120. Using a combination of audience spot division multiplexing (ASDM), targeted audience optimization, and bandwidth dial-up techniques, the addressable advertisement 152 may be provided to the device 116 and the addressable advertisement 162 may be provided to the device 136 as explained herein.

In one or more embodiments, the addressable advertisements 152 and 162 may be presented at different times than originally scheduled based on the enhanced techniques described below, or at the originally scheduled times (e.g., based on BDK use). In particular, when the bandwidth demand at steps 150 and 160 is below a demand threshold (e.g., accounting for the unicast requests 122 and 140, and for the Internet traffic 118 and 138), the system 100 may provide the addressable advertisements 152 and 162 for presentation, avoiding the demand issue of steps 110 and 130 (e.g., which may not account for the bandwidth demand). Alternatively, when the bandwidth demand exceeds available bandwidth, the system 100 may use BDK when the Internet traffic 118 and 138 is sufficiently low, or the system 100 may further segment viewing audiences into subsegments to reduce an audience size at a given time, and may allow for an addressable advertisement to be presented at the time when the audience size results in a bandwidth demand that is below the threshold bandwidth demand.

In one or more embodiments, the system 100 may evaluate viewership patterns of audience segments to predict whether the bandwidth needed to deliver the addressable advertisements 152 and 162 may be sufficient at given times. Based on evaluations of viewership patterns of audience segments at different times of day (e.g., "day parts"), the system 100 may determine viewing scores for audience segments at a respective time, and may approve or reject audiences to manage the scheduled delivery of addressable content based on the viewing scores. For example, a higher viewing score may indicate a higher likelihood (e.g., probability) that an audience segment (e.g., including the viewer 112 and/or the viewer 132) is to watch addressable content at a given time that corresponds to the viewing score (e.g., a viewing score of an audience segment for the time period 8-9 PM may be greater than a viewing score of the audience segment for the time period of 9-10 PM on the same day).

In one or more embodiments, based on viewership projections indicated by a viewing score, the system 100 may recommend content to be provided to the devices 116 and 136 in a manner that preserves bandwidth and allows for improved advertisement targeting of the viewers 112 and 132. In this manner, the system 100 may manage content delivery and customization for multiple viewing audiences whose devices may compete for content during a given day part (e.g., time segment). For example, a targeted advertisement campaign using the addressable advertisement 152 for LSA channel X may be generated for an audience segment with the viewer 112 during a particular day part when the number of viewers to receive the addressable advertisement 152 exceeds a threshold number of viewers.

In one or more embodiments, the system 100 may identify common customers (e.g., viewers) across different audience segments. For example, a household identified as part of two different audience segments for day part (e.g., a LSA Channel X audience segment and a LSA Channel Y audience segment) may be considered one rather than multiple customers. In this manner, the system 100 may break down audience segments into day parts, and determine the day parts during which to ad campaigns may be delivered to different sub-groups of audience segments at different times. For example, a LSA Channel X audience segment during a day part of 6-7 PM may include fifty viewers, and a LSA Channel Y audience segment during the 6-7 PM day part may include fifty viewers. Of the one hundred viewers during the 6-7 PM day part, twenty of the viewers may be in both the LSA Channel Y audience segment and in the LSA Channel X audience segment. Therefore, only thirty viewers may be in the LSA Channel X audience segment and not in the LSA Channel Y audience segment, and only thirty viewers may be in the LSA Channel Y audience segment and not in the LSA Channel X audience segment. The result may be the two groups of thirty viewers in one respective audience segment, and the group of twenty viewers in both audience segments. When the number of DOCSIS streams needed to provide targeted advertisements at a given time does not result in the bandwidth demand exceeding a threshold, the group may be approved to request and receive a targeted addressed advertisement campaign.

In one or more embodiments, the system 100 may predict whether a spike in Internet traffic is likely to occur during an addressable advertisement campaign, thereby creating a risk of bandwidth shortage to deliver both television advertisements and Internet traffic using the same DOCSIS bandwidth. When the spike of Internet traffic (e.g., an amount of Internet traffic exceeds a threshold amount of traffic) overlaps an addressable advertisement campaign spot, the system 100 may adjust criteria to limit the number of addressable advertisement unicast streams needed to provide the advertisements using DOCSIS bandwidth during that time. When the Internet traffic is not projected to exceed the threshold amount (e.g., no spike in traffic), the system 100 may adjust criteria to allow for more addressable advertisement campaigns that may be provided using DOCSIS bandwidth during that time. The system 100 may use a machine learning model to project DOCSIS bandwidth usage for television and/or Internet services at a particular time (e.g., corresponding to a portion of an ad slot reserved for addressable advertisements), and may update the machine learning model based on whether predicted bandwidth usage was accurate.

Figure 4:
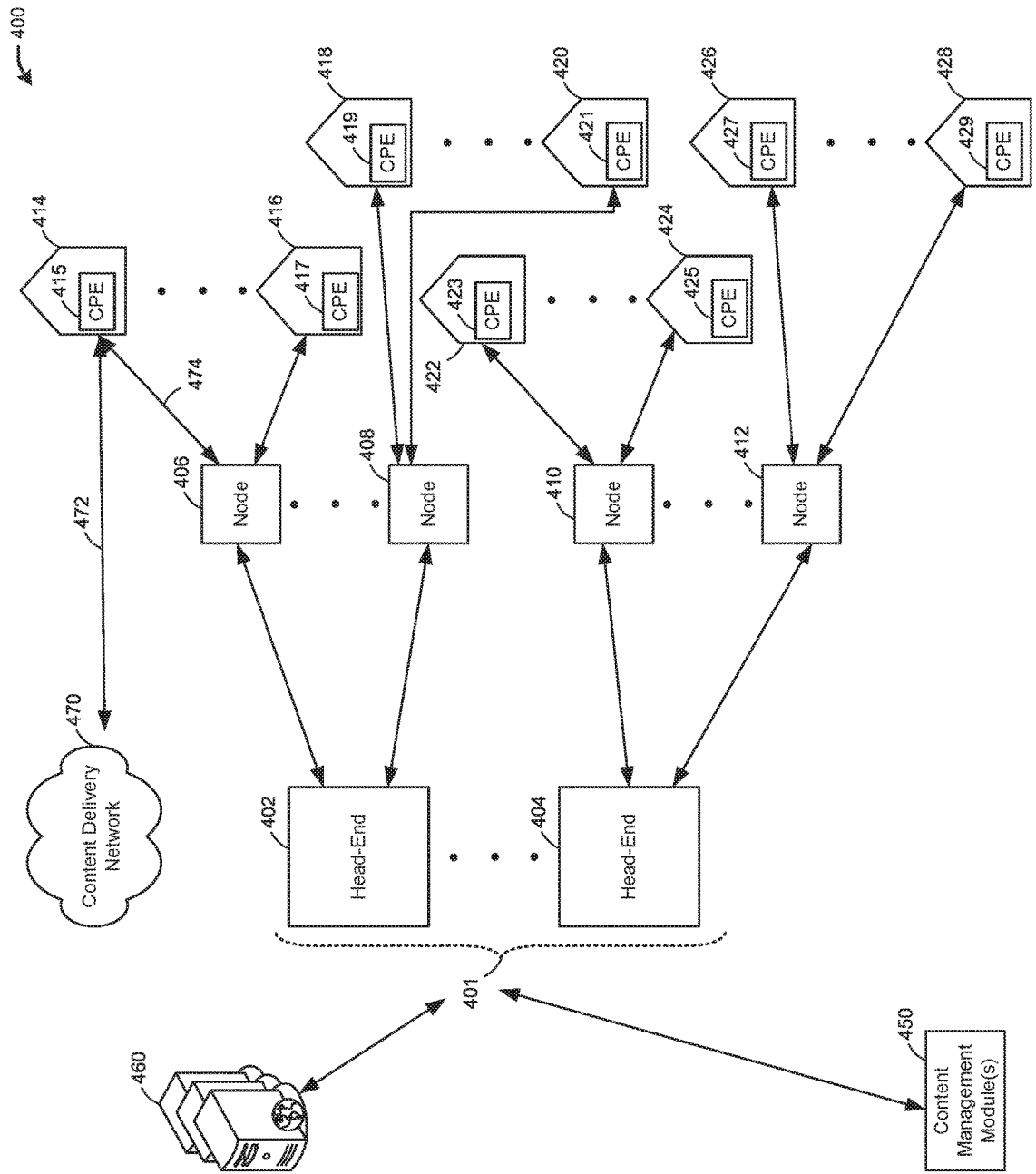
FIG. 4 illustrates an example system for network resource management, in accordance with one or more example embodiments of the present disclosure.

In one or more embodiments, the system 100 may maintain a programming schedule and/or metadata indicative of television channel advertisement break times (e.g., Society of Cable Telecommunications Engineers 224—SCTE 224) that indicates the timing of programming and advertisement slots for LSA channels, including the specific times for broadcast advertisements and for addressable advertisements. For any audience group, the system 100 may select one or more addressable advertisements for an advertisement campaign to send to the node 120. The system 100 may send references to advertisements to the requesting devices (e.g., the device 116, the device 136) associated with the node 120, and the requesting devices may request the referenced advertisements (e.g., from a content delivery network as shown in FIG. 4).

In one or more embodiments, the system 100 may evaluate viewership patterns of audience segments of a node during different day parts. For example, the system 100 may determine that one audience segment is to be targeted during one day part than another day part (e.g., the audience segment may be larger at one day part than another, and the larger day part audience segment may be better to target because more viewers are likely to see an addressable advertisement). By identifying common customers among different audience segments during a day part, the system 100 may allow for use of an addressable advertisement campaign that otherwise may not be presented, and may result in increased advertisement impressions. For example, when three audiences of 100 viewers per audience have 30 overlapping viewers between a first audience and a second audience, 30 overlapping viewers between the second audience and a third audience, thirty overlapping viewers between the first audience and the third audience, and ten viewers who overlap in all three audiences, the ten viewers who overlap in all three audiences may not be added to a cumulative audience size, the viewers that overlap two of the three audiences may partially contribute to the cumulative audience size, and the viewers only in one audience may contribute to the cumulative audience size. By using audience spot division multiplexing (ASDM), the system 100 may multiplex audience members across multiple audiences, which may allow for larger audience sizes without requiring more DOCSIS bandwidth than is available to provide addressable advertisements. Alternatively, a given campaign may run during different dayparts to target each sub-segment of the original audience as recommended. The system may generate an audience is created for a particular campaign. It also is possible that members of the audience are being targeted by two or more ad campaigns, in which case there may be a targeting priority for the system to consider.

In one or more embodiments, the system 100 may identify "flight" dates for any ad campaign. Based on the flight dates for a campaign, the system 100 may identify the audiences available at different day parts during the flight dates. The system 100 may determine whether the likelihood (e.g., probability) of a campaign being viewed by a threshold number of viewers exceeds a probability threshold. The system 100 may identify audience segments having overlapping times, and may predict bandwidth needed to provide ad campaigns and Internet service using DOCSIS bandwidth at any time. Based on bandwidth need and common customers identified among multiple audience segments, the system 100 may select addressable ad campaigns and their flights for delivery to nodes that service the audience segments.

In one or more embodiments, the system 100 may determine an audience segment for a node, and may determine viewership for the audience segment (e.g., may rank audience members based on the viewing score during a day part). The system may determine the LSA channels that the audience members of the audience segment watch the most. Based on the most-watched LSA channels for given audience members, the system may determine advertisement spot alignments (e.g., aligned portions of advertisement slots for the ad campaigns on the LSA channels). Using audience spot division multiplexing (ASDM), the system 100 may consider multiple members who watch different unaligned LSA channels as needing only one ad stream as described above (e.g., the members may be one customer who watches different LSA channels). Based on the number of streams needed to deliver ad campaigns to the node 120 using DOCSIS bandwidth, the system 100 may determine the expected downstream DOCSIS bandwidth needed. When the needed audience bandwidth is below a threshold bandwidth, the system 100 may "pass" or "confirm" the audience to request unicast streams to deliver targeted advertisements using the DOCSIS bandwidth. When the needed audience bandwidth exceeds the threshold bandwidth, the system 100 may apply a bandwidth dial-up knob (BDK) to allow for a higher bandwidth threshold (e.g., 20% higher, or another number). When the needed audience bandwidth does not exceed the increased (e.g., dialed up) threshold bandwidth, the system 100 may pass or confirm the audience. Otherwise, the system 100 may reduce audience size based on viewership rank until the size of an audience (e.g., required unicast DOCSIS streams) falls below the increased threshold bandwidth. The BDK may be employed when Internet traffic is predicted to be below a traffic threshold (e.g., based on previous usage at a node during a day part). When an audience is passed or confirmed, the system may determine the best option to achieve ad impression goals by splitting the audience segment across multiple day parts based on viewership patterns (e.g., determining day parts during which the audience segment size is largest). To reduce the audience size, the system 100 may allow for use of a day part during which the audience segment size is not the largest to deliver an ad campaign, or may further analyze the audience to break down the audience into smaller segments and day parts (e.g., smaller durations of time). In some occasions, when an audience contributes to bandwidth usage that exceeds the threshold bandwidth and cannot be broken down into a smaller size needing bandwidth below the threshold bandwidth, the system 100 may reject an audience, preventing the rejected audience from receiving addressable advertisements at a given time.

Devices such as the devices 114, 116, 134, and 136 may include a hardware processor (e.g., a central processing unit (CPU), a graphics processing unit (GPU), a hardware processor core, or any combination thereof), a main memory and a static memory, some or all of which may communicate with each other via an interlink or network. Devices may further include a power management device, a graphics display device, an alphanumeric input device (e.g., a keyboard), and a user interface (UI) navigation device (e.g., a mouse). In an example, the graphics display device, alphanumeric input device, and UI navigation device may be a touch screen display. Devices may additionally include a storage device (i.e., drive unit), a signal generation device (e.g., a speaker), and a network interface device/transceiver coupled to antenna(s). Devices may include an output controller, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

Devices may include a machine readable medium on which is stored one or more sets of data structures or instructions (e.g., software) embodying or utilized by any one or more of the techniques or functions described herein. The instructions may also reside, completely or at least partially, within a main memory, within a static memory, or within the hardware processor during execution thereof. In an example, one or any combination of the hardware processor, the main memory, the static memory, or the storage device may constitute machine-readable media.

Figure 2A:
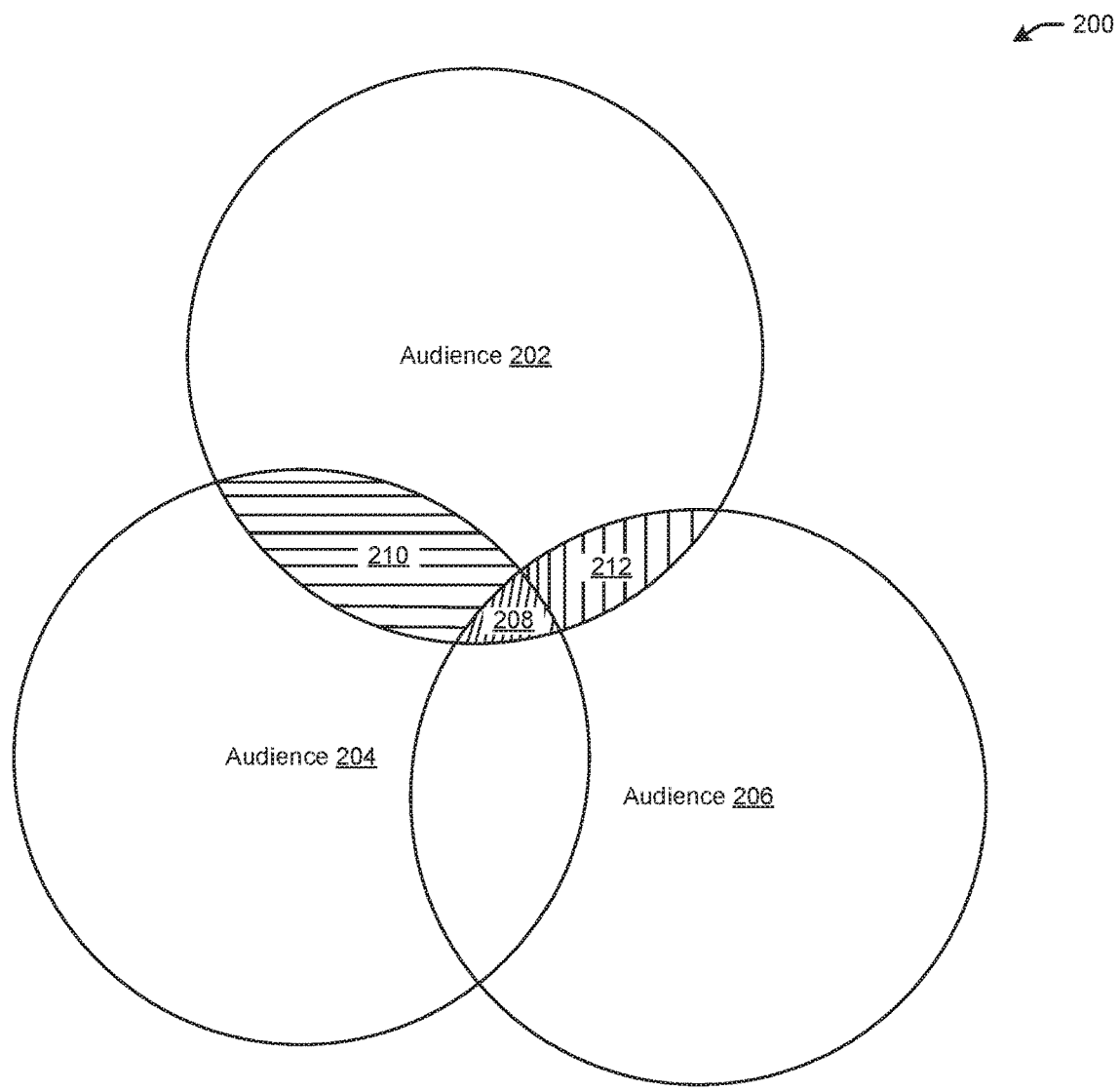
FIG. 2A illustrates example audience segments for network resource management, in accordance with one or more example embodiments of the present disclosure.

FIG. 2A illustrates example audience segments 200 for network resource management and content delivery, in accordance with one or more example embodiments of the present disclosure.

Referring to FIG. 2A, the audience segments may include audience 202, audience 204, and audience 206, each of which overlap. For example, audience 208 may represent viewers in the audience 202, the audience 204, and the audience 206. Audience 210 may represent viewers in the audience 202 and the audience 204, but not in the audience 206. Audience 212 may represent viewers in the audience 202 and the audience 206, but not in the audience 204. The viewers of each audience segment may count as cumulative to the total audience size serviced by a node (e.g., the node 120 of FIG. 1). For example, each individual viewer may count toward the bandwidth demand. The viewers of multiple, but not all, audience segments (e.g., the audience 210 and the audience 212) may be partially cumulative to the total audience size serviced by the node. For example, viewers in the audience 210 and the audience 212 may count as two individual viewers toward the bandwidth demand, divided by three (e.g., the number of audiences serviced by the node). Viewers of the audience 212 (e.g., viewers in all audience segments serviced by a node) may not be cumulative at all, and therefore may not count toward the bandwidth demand. In this manner, the number of viewers may be a sum of the viewers in the audiences 202, 204, and 206, added to partial viewers represented by the viewers of audiences 210 and 212.

Figure 2B:
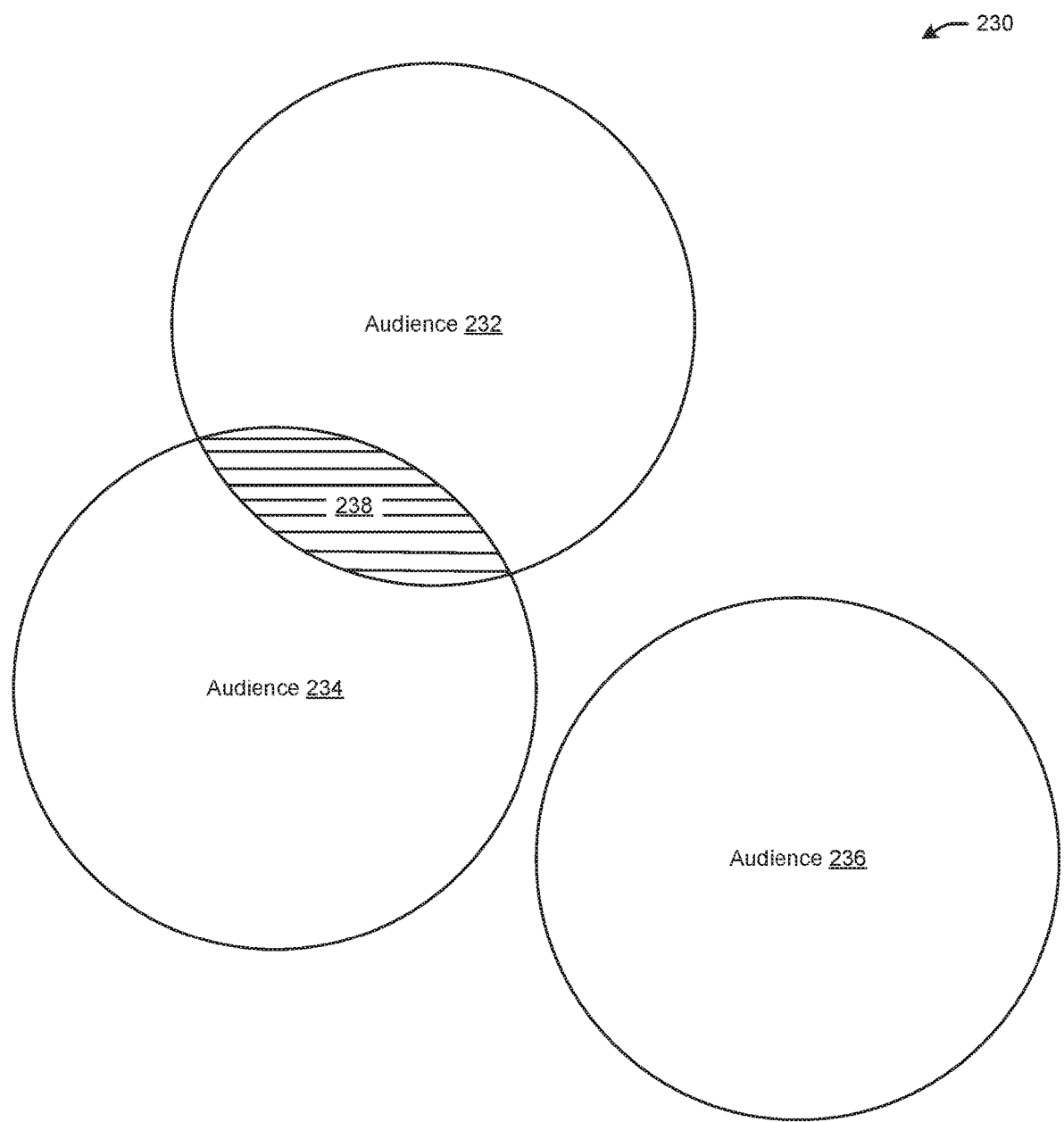
FIG. 2B illustrates example audience segments for network resource management, in accordance with one or more example embodiments of the present disclosure.

FIG. 2B illustrates example audience segments 230 for network resource management and content delivery, in accordance with one or more example embodiments of the present disclosure.

Referring to FIG. 2B, the audience segments may include audience 232, audience 234, and audience 236. The audience 232 may overlap with the audience 234, and the audience 236 may have no overlap with other audiences. The overlapping viewers of the audiences 232 and 234 may be represented by audience 238. The individual viewers only in one respective audience may count toward the total audience size used to determine bandwidth demand, and the viewers of the audience 238 may not count toward the audience size. In this manner, the audience size is not increased by the viewers of the audience 238.

Figure 2C:
FIG. 2C illustrates example audience segments for network resource management, in accordance with one or more example embodiments of the present disclosure.

FIG. 2C illustrates example audience segments 260 for network resource management and content delivery, in accordance with one or more example embodiments of the present disclosure.

Referring to FIG. 2C, the audience segments may include audience 262, audience 264, and audience 266, none of which overlap. In this manner, all viewers of the three audiences may count toward the total audience size (e.g., a worst-case scenario).

Figure 3:
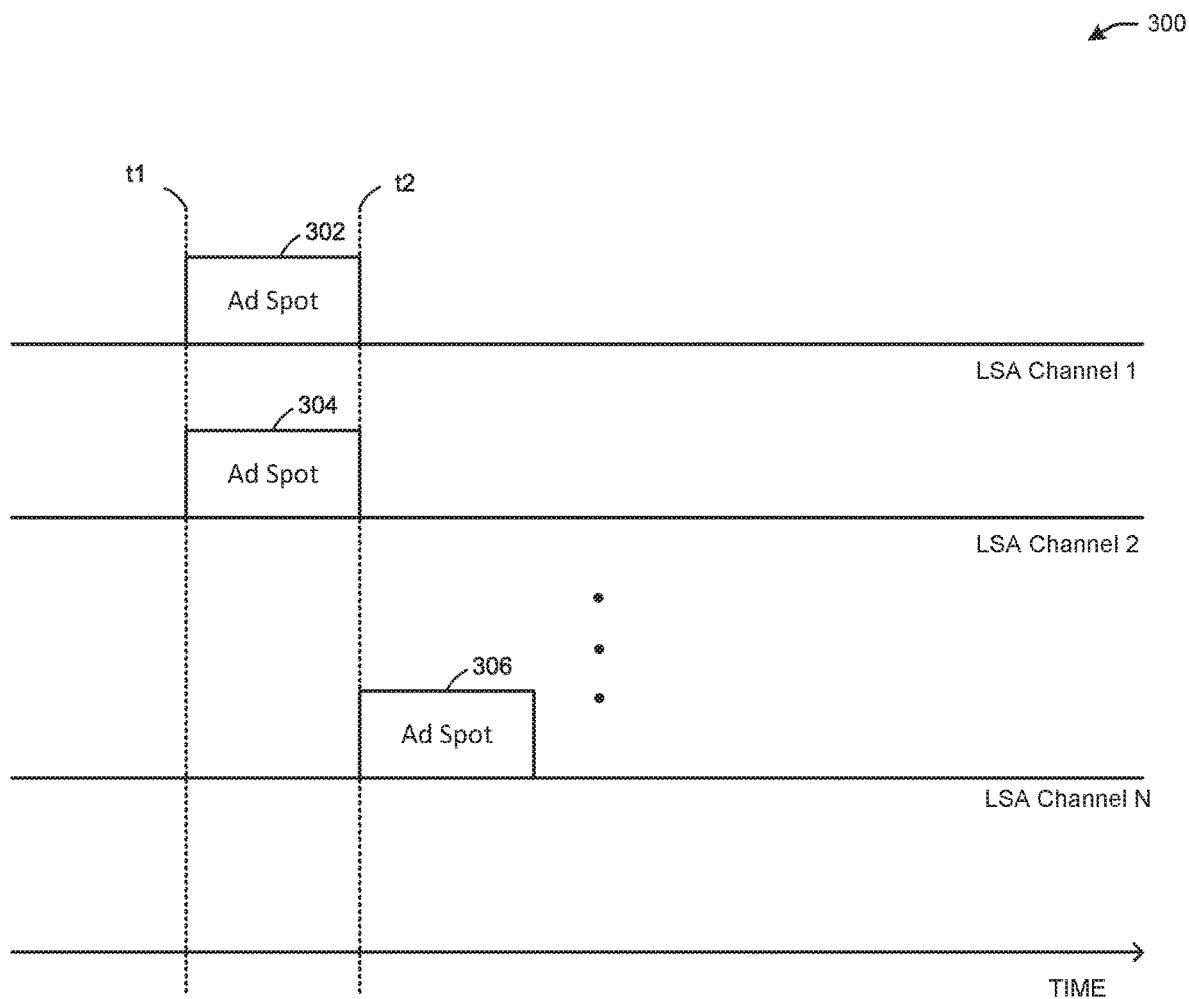
FIG. 3 illustrates example advertisement spots for network resource management, in accordance with one or more example embodiments of the present disclosure.

FIG. 3 illustrates example advertisement spots 300 for network resource management and content delivery, in accordance with one or more example embodiments of the present disclosure.

Referring to FIG. 3, advertisement spots during ad breaks (e.g., ad slots) may be scheduled for multiple LSA channels (e.g., allowing for at least a portion of a respective advertisement spot to be used for addressable advertisements). As shown, ad spot 302 is allocated for LSA channel 1 between time t1 and time t2. Ad spot 304 is allocated for LSA channel 2 between time t1 and time t2. Ad spot 306 is allocated for LSA channel N beginning at time t2. In this manner, the ad spots 302 and 304 may align on the LSA channels 1 and 2. Two different viewers (e.g., one of the LSA channel 1 and one of the LSA channel 2) may contribute to a need for two different ad streams—one addressable ad stream for the LSA channel 1 during the ad spot 302, and one addressable ad stream for the LSA channel 2 during the ad spot 304. When the addressable ad spot on multiple LSA channels overlap, different addressable ad streams may be sent concurrently over DOCSIS bandwidth, thereby increasing bandwidth demand. A viewer of LSA channel N may receive another addressable ad during the ad spot 306, but because the ad spot 306 is not aligned with the ad spot 302 or the ad spot 304, an addressable ad stream used to deliver addressable ads during the ad spot 306 may not add to bandwidth demand from time t1 to time t2. In this manner, scheduling ad spots so that addressable ad times on different LSA channels do not overlap may avoid significant increases in bandwidth demand to deliver multiple addressable ad streams, but in situations when ad spots may overlap, increased bandwidth demand may be accounted for and mitigated in some situations based on the enhanced techniques described herein.

FIG. 4 illustrates an example system 400 for network resource management and content delivery, in accordance with one or more example embodiments of the present disclosure.

Referring to FIG. 4, the system 400 may include head-ends (e.g., head-end 402, head-end 404), which may refer to a facility and/or devices for receiving and processing signals, and distributing content (e.g., television content) to nodes (e.g., hybrid fiber-coaxial—HFC—nodes such as node 406, node 408, node 410, node 412), and ultimately to CPE of customer homes (e.g., home 414 with CPE 415 serviced by node 406, home 416 with CPE 417 serviced by node 406, home 418 with CPE 419 serviced by node 408, home 420 with CPE 421 serviced by node 408, home 422 with CPE 423 serviced by node 410, home 424 with CPE 425 serviced by node 410, home 426 with CPE 427 serviced by node 412, home 428 with CPE 429 serviced by node 412). The nodes may include switches, taps, amplifiers, splitters, and the like to receive signals from the head-ends, and to provide content in the form of signals to the CPE of many homes. The nodes may collect metrics and receive unicast requests from respectively serviced CPE, and may provide the metrics and unicast requests to the head-ends and/or to one or more content management modules 450, which may be implemented in a head-end or in a remote device (e.g., a service center, a cloud-based environment, or the like).

In one or more embodiments, the one or more content management modules 450 may determine which portions (e.g., spots) of an advertising slot to allocate to a LSA channel for addressable advertisements. For example, in an advertising slot that includes time for national broadcast advertisements and time for local advertisements, the one or more content management modules 450 may allocate a first portion of the time for local advertisements to present addressable advertisements to one LSA channel, and may allocate a second portion of the time for local advertisements to present addressable advertisement to another LSA channel. Using the example of the MSNBC and Fox News LSA channels, for a minute of local advertising scheduled at the same time for both MSNBC and Fox News, the one or more content management modules 450 may select the first thirty seconds of the local advertisement time for presentation of addressable advertisements on MSNBC, and may select the last thirty seconds of the local advertisement time for presentation of addressable advertisements on Fox News. In this manner, the one or more content management modules 450 may avoid overlapping addressable advertisement spots on some LSA channels. To reduce bandwidth usage, the one or more content management modules 450 may avoid scheduling multiple overlapping addressable advertisements to send to a node using DOCSIS bandwidth, especially for LSA channels with significant viewership during a particular day part. As a result, playback devices tuned to Fox News may not send unicast requests to the system 400 at the same time as playback devices tuned to MSNBC, allowing the system 400 to reduce the number of unicast requests to process at one time, and corresponding addressable advertisement responses sent at one time. However, having different addressable advertisement times allocated to different channels may not always occur, so to address situations when some LSA channels have overlapping addressable advertisement times, the system 400 may evaluate audience segments as described below.

In one or more embodiments, the one or more content management modules 450 may evaluate viewership patterns of audience segments to predict whether the bandwidth needed to deliver addressable advertisements for LSA channel programming may be sufficient at given times. Based on evaluations of viewership patterns of audience segments at different times of day (e.g., "day parts"), the one or more content management modules 450 may determine viewing scores for audience segments at a respective time, and may manage the scheduled delivery of addressable content based on the viewing scores. For example, a higher viewing score may indicate a higher likelihood (e.g., probability) that an audience segment is to watch addressable content at a given time that corresponds to the viewing score (e.g., a viewing score of an audience segment for the time period 8-9 PM may be greater than a viewing score of the audience segment for the time period of 9-10 PM on the same day).

In one or more embodiments, based on viewership projections indicated by a viewing score, the one or more content management modules 450 may send advertisement references to the CPE, which the CPE may use to request addressable advertisements as discussed further below, and may segment audiences in manner that preserves bandwidth and allows for improved advertisement targeting of viewers. In particular, the one or more content management modules 450 may anticipate bandwidth limitations at one or more nodes and segment audiences accordingly. In this manner, the system 400 may manage content delivery and customization for multiple viewing audiences whose devices may compete for content during a given day part (e.g., time segment). For example, a targeted advertisement campaign using addressable advertisements for a LSA channel may be generated for an audience segment during a particular day part when the number of viewers to receive the addressable advertisements exceeds a threshold number of viewers. In this manner, if a subset N of households viewers at a node are part of a targeted audience, there will be N unicast streams to download the same advertisement. The same advertisement is provided because the N active viewers are part of the same audience. When there is a second audience of with P active households viewers at the same node watching various channels that happened to be in spots alignment, then, there would be N+P concurrent unicast requests to download two advertisements, one N times and the other P times.

In one or more embodiments, in this manner, the one or more content management modules 450 may identify common customers across different audience segments. For example, a household identified as part of two different audience segments for day part (e.g., an MSNBC audience segment and a Fox News audience segment) may be considered one rather than multiple customers. In this manner, the one or more content management modules 450 may break down audience segments into day parts, and determine the day parts during which to deliver ad campaigns to different sub-groups of audience segments at different times. For example, a MSNBC audience segment during a day part of 6-7 PM may include fifty viewers, and a Fox News audience segment during the 6-7 PM day part may include fifty viewers. Of the one hundred viewers during the 6-7 PM day part, twenty of the viewers may be in both the Fox News audience segment and in the MSNBC audience segment. Therefore, only thirty viewers may be in the MSNBC audience segment and not in the Fox News audience segment, and only thirty viewers may be in the Fox News audience segment and not in the MSNBC audience segment. The result may be the two groups of thirty viewers in one respective audience segment, and the group of twenty viewers in both audience segments.

In one or more embodiments, the one or more content management modules 450 may predict whether a spike in Internet traffic is likely to occur during an addressable advertisement campaign, thereby creating a risk of bandwidth shortage to deliver both television advertisements and Internet traffic using the same DOCSIS bandwidth (e.g., the bandwidth used to deliver content from the nodes to the CPE may use DOCSIS bandwidth). When the spike of Internet traffic (e.g., an amount of Internet traffic exceeds a threshold amount of traffic) overlaps an addressable advertisement campaign spot, the one or more content management modules 450 may adjust criteria to limit the number of addressable advertisement campaigns that may be provided using DOCSIS bandwidth during that time (e.g., by requiring a larger threshold number of viewers in a targeted group for addressable advertisements). When the Internet traffic is not projected to exceed the threshold amount (e.g., no spike in traffic), the one or more content management modules 450 may adjust criteria to allow for more addressable advertisement campaigns that may be provided using DOCSIS bandwidth during that time (e.g., by requiring a smaller threshold number of viewers in a targeted group for addressable advertisements). The one or more content management modules 450 may use a machine learning model to project DOCSIS bandwidth usage for television and/or Internet services at a particular time (e.g., corresponding to a portion of an ad slot reserved for addressable advertisements), and may update the machine learning model based on whether predicted bandwidth usage was accurate.

In one or more embodiments, the one or more content management modules 450 may maintain a programming schedule that indicates the timing of programming and advertisement slots for LSA channels, including the specific times for broadcast advertisements and for addressable advertisements. When a CPE identifies an upcoming spot for addressable advertisements, the playback device may send a unicast request to the system 400 (e.g., to a node). The unicast request may include an identifier of the CPE, such as a MAC address. Based on the identifier of the CPE, the one or more content management modules 450 may determine which audience group(s) the CPE represents (e.g., based on data indicating when the device is presenting programming, which programming is being presented, viewer preferences, and the like). For any audience group, the one or more content management modules 450 may provide to requesting CPE references to addressable advertisements, and the CPE may request the referenced addressable advertisements as described further below.

In one or more embodiments, the one or more content management modules 450 may evaluate viewership patterns of audience segments of a node during different day parts. For example, the one or more content management modules 450 may determine that one audience segment is to be targeted during one day part than another day part (e.g., the audience segment may be larger at one day part than another, and the larger day part audience segment may be better to target because more viewers are likely to see an addressable advertisement). By identifying common customers among different audience segments during a day part, the one or more content management modules 450 may allow for use of an addressable advertisement campaign that otherwise may not be presented, and may result in increased advertisement impressions. By using ASDM, the one or more content management modules 450 may multiplex audience members across multiple audiences, which may allow for larger audience sizes without requiring more DOCSIS bandwidth than is available to provide addressable advertisements.

In one or more embodiments, given a campaign for an audience, the one or more content management modules 450 may segment the audience into dayparts and recommend that the campaign date and flight times be adjusted when the one or more content management modules 450 identifies a bandwidth limitation at one or more nodes. A content provider 460 may provide advertisement content (e.g., to the head-ends to be sent downstream to the CPE), and based on the flight dates for a campaign, the one or more content management modules 450 may identify the audiences available at different day parts during the flight dates. The one or more content management modules 450 may determine whether the likelihood (e.g., probability) of a campaign being viewed by a threshold number of viewers exceeds a probability threshold. The one or more content management modules 450 may identify audience segments having overlapping times, and may predict bandwidth needed to provide ad campaigns and Internet service using DOCSIS bandwidth at any time. Based on bandwidth need and common customers identified among multiple audience segments, the one or more content management modules 450 may approve the audience segments to request addressable advertisements.

In one or more embodiments, the CPE may connect to the nodes using quadrature amplitude modulation (QAM) channels, allowing cable television programming to be transmitted to the CPE and the CPE may connect to a content delivery network (CDN) 470 (e.g., a network of one or more devices capable of delivering advertisements and/or other data) using unicast streams of DOCSIS channels. For example, the CPE 415 may use a DOCSIS channel 472 to request and receive addressable targeted advertisements from the CDN 470, and may receive television content from the node 406 via a QAM channel 474. The other CPE in FIG. 4 may connect to the CDN 470 using the DOCSIS channel 472 or another DOCSIS channel, and may connect to respective nodes using respective QAM channels (e.g., the arrows between the customers and nodes as shown). In particular, CPE may leave a QAM channel to access a DOCSIS channel to request advertisements referenced by the one or more content management modules 450. The CDN 470 may receive addressable advertisement requests from the DOCSIS channel(s), and may provide the addressable advertisements using the DOCSIS channel(s).

In one or more embodiments, the one or more content management modules 450 may determine an audience segment for a node, and may determine viewership for the audience segment (e.g., may rank audience members based on the viewing score during a day part). The one or more content management modules 450 may determine the LSA channels that the audience members of the audience segment watch the most. Based on the most-watched LSA channels for given audience members, the one or more content management modules 450 may determine advertisement spot alignments (e.g., aligned time slots for the ad campaigns on the LSA channels). Using ASDM, the one or more content management modules 450 may consider multiple members who watch different unaligned LSA channels as needing only one ad stream as described above (e.g., the members may be one customer who watches different LSA channels). Based on the number of streams needed to deliver ad campaigns to a node using DOCSIS bandwidth, the one or more content management modules 450 may determine the expected downstream DOCSIS bandwidth needed. When the needed audience bandwidth is below a threshold bandwidth, the system may "pass" or "confirm" the audience. When the needed audience bandwidth exceeds the threshold bandwidth, the one or more content management modules 450 may apply a BDK to allow for a higher bandwidth threshold (e.g., 20% higher, or another number). When the needed audience bandwidth does not exceed the increased (e.g., dialed up) threshold bandwidth, the one or more content management modules 450 may pass or confirm the audience to request unicast streams for targeted advertisements to be delivered using DOCSIS channel bandwidth. Otherwise, the system may reduce audience size based on viewership rank until the bandwidth demand for targeted advertisement streams corresponding to the size of an audience falls below the increased threshold bandwidth. The BDK may be employed when Internet traffic is predicted to be below a traffic threshold (e.g., based on previous usage of user devices connected to a node during a day part). When an audience is passed or confirmed, the one or more content management modules 450 may determine the best option to achieve ad impression goals by splitting the audience segment across multiple day parts based on viewership patterns (e.g., determining day parts during which the audience segment size is largest). To reduce the audience size, the one or more content management modules 450 may allow for use of a day part during which the audience segment size is not the largest to deliver an ad campaign, or may further analyze the audience to break down the audience into smaller segments and day parts (e.g., smaller durations of time). In some occasions, when an audience contributes to bandwidth usage that exceeds the threshold bandwidth (e.g., due to the number of unicast streams needed to deliver targeted advertisements to the audience's playback devices for presentation) and cannot be broken down into a smaller size needing bandwidth below the threshold bandwidth, the one or more content management modules 450 may reject an audience.

Figure 5:
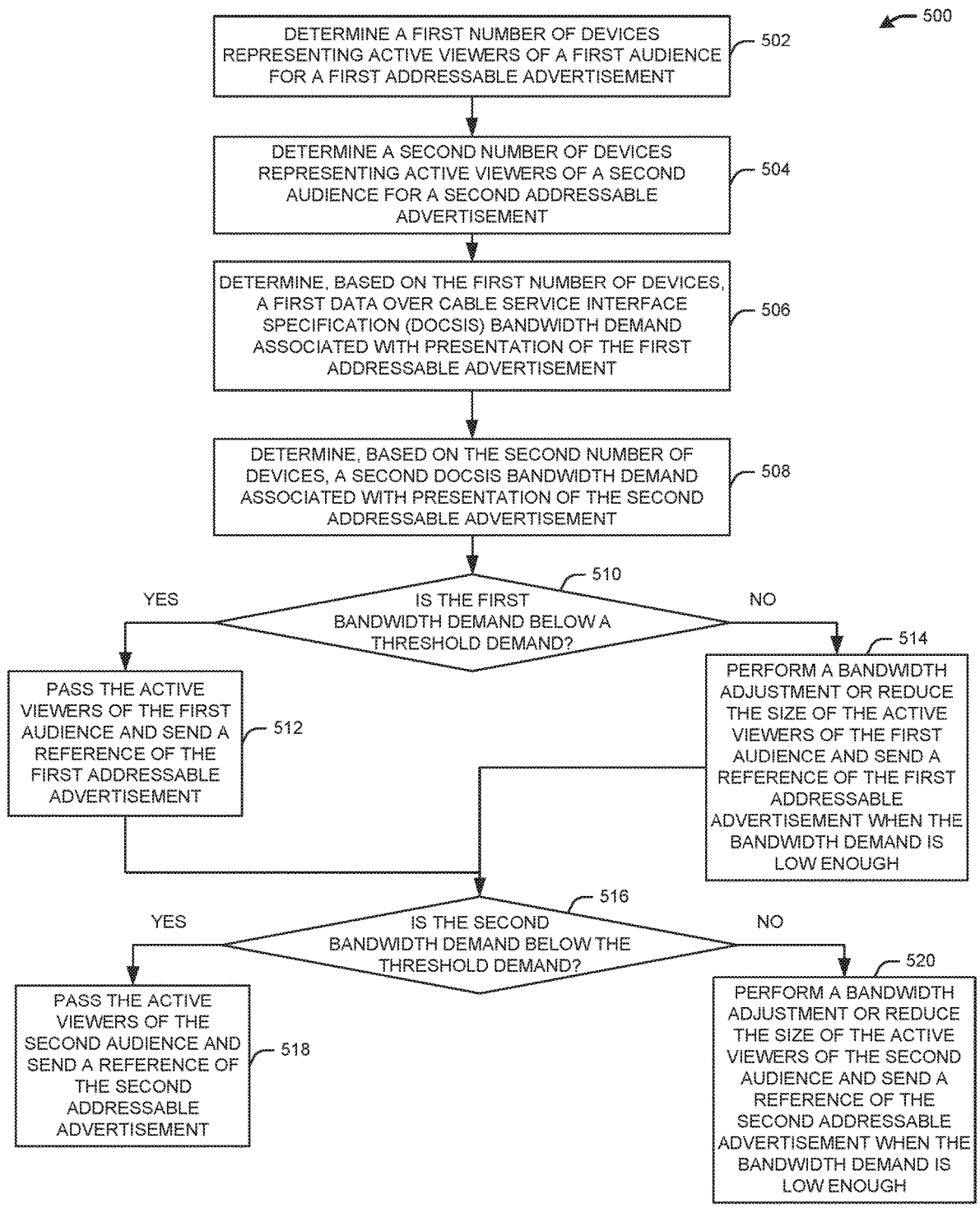
FIG. 5 illustrates a flow diagram of illustrative process for network resource management, in accordance with one or more example embodiments of the present disclosure.

FIG. 5 illustrates a flow diagram of illustrative process 500 for network resource management and content delivery, in accordance with one or more example embodiments of the present disclosure.

At block 502, a system (or device, e.g., the one or more content management modules 450 of FIG. 4) may determine a first number of devices (e.g., the CPE shown in FIG. 4) that represent active viewers of a LSA television channel at a first time representing an advertisement spot during an advertisement slot. The first number of devices may represent a subset of devices connected to a node (e.g., the nodes of FIG. 4) for receiving television content, and which may receive the same first addressable advertisement at the first time. The system may determine the likelihood that the first number of devices are to be tuned to the LSA channel at the first time, and when the likelihood exceeds a threshold, the system may determine that the first number of devices represents an active viewing audience from among a larger set of devices connected to the same node. For example, any node may provide content (e.g., television, Internet, etc.) to multiple CPE of multiple homes. The system may have access to information indicating the specific television channels to which CPE are tuned at certain times. The system may evaluate viewership patterns of audience segments to predict whether the bandwidth needed to deliver addressable advertisements for LSA channel programming may be sufficient at given times. For example, a node servicing one hundred user devices may provide addressable content to forty user devices at a particular time (e.g., based on the number of user devices tuned to LSA channels at the particular time). In this manner, an audience segment of one hundred people may result in forty targeted viewers (or user devices) at the particular time.

At block 504, the system may determine a second number of devices (e.g., the CPE shown in FIG. 4) that represent active viewers of the LSA television channel at a second time representing an advertisement spot during the advertisement slot. The second number of devices may represent a subset of devices connected to the node (e.g., the nodes of FIG. 4) for receiving television content, and which may receive the same second addressable advertisement at the second time. The system may determine the likelihood that the second number of devices are to be tuned to the LSA channel at the second time, and when the likelihood exceeds a threshold, the system may determine that the second number of devices represents an active viewing audience from among a larger set of devices connected to the same node. The system may determine audience rankings for audience segments for respective day parts. Based on evaluations of viewership patterns of audience segments at different day parts, the system may determine viewing scores for audience segments at a respective time, and may manage the scheduled delivery of addressable content based on the viewing scores. For example, a higher viewing score may indicate a higher likelihood (e.g., probability) that an audience segment is to watch addressable content at a given time that corresponds to the viewing score (e.g., a viewing score of an audience segment for the time period 8-9 PM may be greater than a viewing score of the audience segment for the time period of 9-10 PM on the same day).

At block 506, the system may determine a first DOCSIS bandwidth demand for addressable advertisements during advertisement spots based on the first number of devices. In particular, because the first number of devices each would use a unicast stream using DOCSIS bandwidth to request and receive the first addressable advertisement, the first DOCSIS bandwidth demand may be based on the number of unicast requests (e.g., the number of respective first devices) and the bandwidth required for each unicast delivery of the first addressable advertisement using DOCSIS bandwidth. Based on the number of streams needed to deliver addressable advertisement campaigns to a node using DOCSIS bandwidth, the system may determine the expected downstream DOCSIS bandwidth needed. The system also may account for other demand on DOCSIS bandwidth caused by Internet traffic and/or other advertisement unicast streams needed to deliver addressable advertisements to a different audience at the first time. In this manner, advertisement spot alignment for multiple sets of devices representing different active audiences targeted by different advertisement campaigns may contribute to bandwidth demand.

Similarly, at block 508, the system may determine a second DOCSIS bandwidth demand for addressable advertisements during advertisement spots based on the second number of devices. In particular, because the second number of devices each would use a unicast stream using DOCSIS bandwidth to request and receive the second addressable advertisement, the second DOCSIS bandwidth demand may be based on the number of unicast requests (e.g., the number of respective second devices) and the bandwidth required for each unicast delivery of the second addressable advertisement using DOCSIS bandwidth. Based on the number of streams needed to deliver addressable advertisement campaigns to a node using DOCSIS bandwidth, the system may determine the expected downstream DOCSIS bandwidth needed. The system also may account for other demand on DOCSIS bandwidth caused by Internet traffic and/or other advertisement unicast streams needed to deliver addressable advertisements to a different audience at the second time. In this manner, advertisement spot alignment for multiple sets of devices representing different active audiences targeted by different advertisement campaigns may contribute to bandwidth demand.

At block 510, the system may determine whether the first bandwidth demand is below a threshold demand. Based on the number of streams needed to deliver ad campaigns to a node using DOCSIS bandwidth, the system may determine the expected downstream DOCSIS bandwidth needed. When the needed audience bandwidth is below a threshold bandwidth, the system may "pass" or "confirm" the audience at block 512, and may send references of advertisements to requesting customer devices that the customer devices may include in requests for advertisements as described with respect to FIG. 4. When the needed audience bandwidth exceeds the threshold bandwidth, the system may, at block 514, apply a BDK to allow for a higher bandwidth threshold (e.g., 20% higher, or another number). When the needed audience bandwidth exceeds the increased (e.g., dialed up) threshold bandwidth, the system may pass or confirm the audience and may send references of advertisements to requesting customer devices that the customer devices may include in requests for advertisements as described with respect to FIG. 4. Otherwise, the system may reduce audience size based on viewership rank until the size of an audience falls below the increased threshold bandwidth. The BDK may be employed when Internet traffic is predicted to be below a traffic threshold (e.g., based on previous usage at a node during a day part). When an audience is passed or confirmed, the system may determine the best option to achieve ad impression goals by splitting the audience segment across multiple day parts based on viewership patterns (e.g., determining day parts during which the audience segment size is largest). To reduce the audience size, the system may allow for use of a day part during which the audience segment size is not the largest to deliver an ad campaign, or may further analyze the audience to break down the audience into smaller segments and day parts (e.g., smaller durations of time). In some occasions, when an audience contributes to bandwidth usage that exceeds the threshold bandwidth and cannot be broken down into a smaller size needing bandwidth below the threshold bandwidth, the system may reject an audience and may recommend targeting the audience at a later date/time. However, the addition of a new campaign for the audience at a later/date time may impact bandwidth at one or more nodes, so the system may account for the bandwidth demand at that future date/time.

At block 516, the system may determine whether the second bandwidth demand is below a threshold demand. Based on the number of streams needed to deliver ad campaigns to a node using DOCSIS bandwidth, the system may determine the expected downstream DOCSIS bandwidth needed. When the needed audience bandwidth is below a threshold bandwidth, the system may "pass" or "confirm" the audience at block 518, and may send references of advertisements to requesting customer devices that the customer devices may include in requests for advertisements as described with respect to FIG. 4. When the needed audience bandwidth exceeds the threshold bandwidth, the system may, at block 520, apply a BDK to allow for a higher bandwidth threshold (e.g., 20% higher, or another number). When the needed audience bandwidth exceeds the increased (e.g., dialed up) threshold bandwidth, the system may pass or confirm the audience and may send references of advertisements to requesting customer devices that the customer devices may include in requests for advertisements as described with respect to FIG. 4. Otherwise, the system may reduce audience size based on viewership rank until the size of an audience falls below the increased threshold bandwidth. The BDK may be employed when Internet traffic is predicted to be below a traffic threshold (e.g., based on previous usage at a node during a day part). When an audience is passed or confirmed, the system may determine the best option to achieve ad impression goals by splitting the audience segment across multiple day parts based on viewership patterns (e.g., determining day parts during which the audience segment size is largest). To reduce the audience size, the system may allow for use of a day part during which the audience segment size is not the largest to deliver an ad campaign, or may further analyze the audience to break down the audience into smaller segments and day parts (e.g., smaller durations of time). In some occasions, when an audience contributes to bandwidth usage that exceeds the threshold bandwidth and cannot be broken down into a smaller size needing bandwidth below the threshold bandwidth, the system may reject an audience and may recommend targeting the audience at a later date/time. However, the addition of a new campaign for the audience at a later/date time may impact bandwidth at one or more nodes, so the system may account for the bandwidth demand at that future date/time.

It is understood that the above descriptions are for purposes of illustration and are not meant to be limiting.

Figure 6:
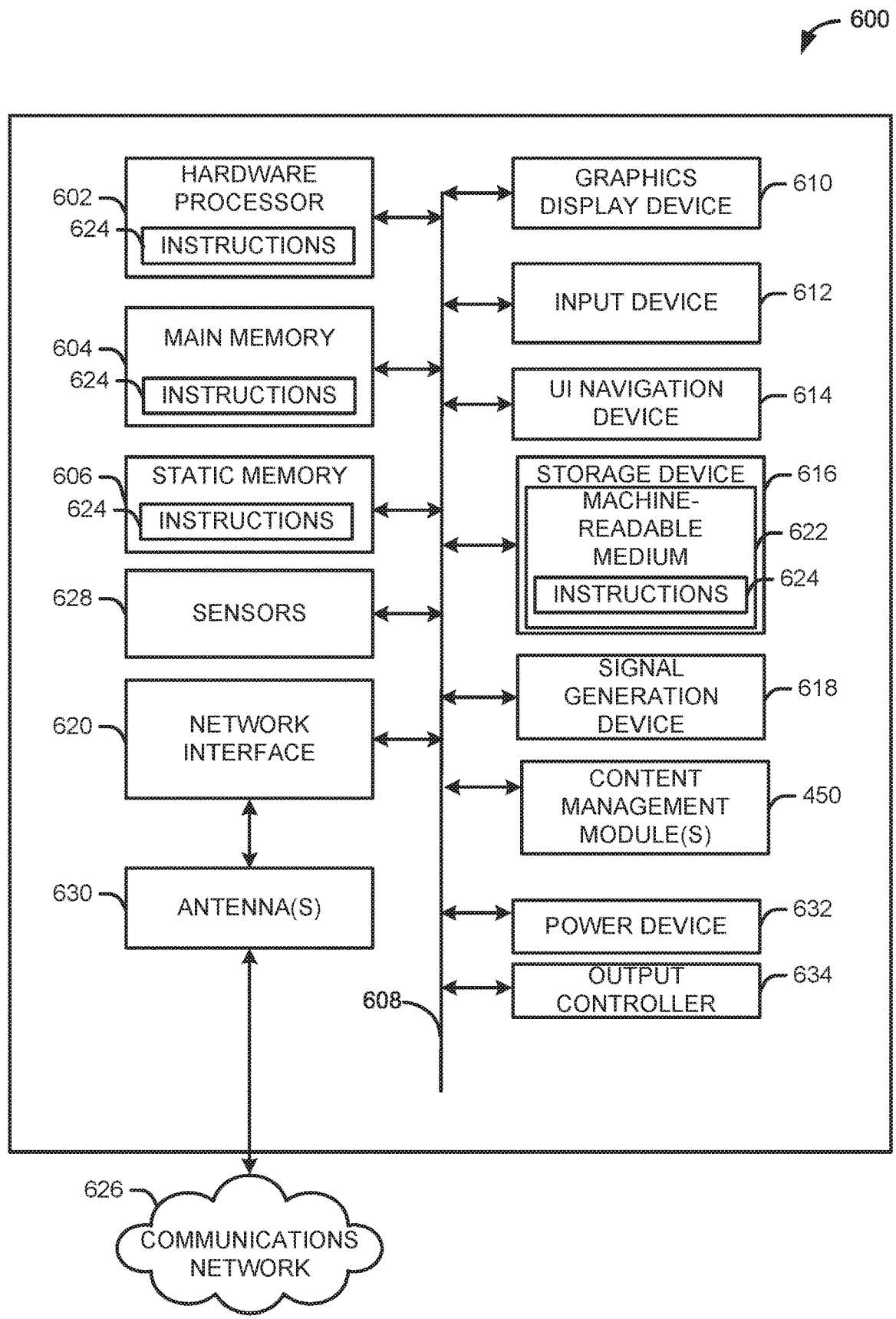
FIG. 6 illustrates a block diagram of an example machine upon which any of one or more techniques (e.g., methods) may be performed, in accordance with one or more example embodiments of the present disclosure.

FIG. 6 illustrates a block diagram of an example of a machine 600 (e.g., implemented in whole or in part by any of the devices shown in FIGS. 1-5) or system upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. The machine 600 may be a wearable device or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include any combination of the illustrated components. For example, the machine 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618 (e.g., a data signal), the one or more content management modules 450 of FIG. 4, a network interface device/transceiver 620 coupled to antenna(s) 630, and one or more sensors 628, such as a sound detecting sensor (e.g., a microphone), accelerometers, magnetometers, location sensors, and the like. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, other sensors, etc.)).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices;

magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include DOCSIS, a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cable box, a wearable smart device, cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a wearable smart device, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, DOCSIS, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A method of providing content, the method comprising:

determining, by at least one processor of a first device, a first bandwidth demand associated with sending a first addressable advertisement using a data over cable service interface specification (DOCSIS) bandwidth for presentation at a second device using a first advertisement spot occurring at a first time during a first time duration;

determining, by the at least one processor, a second bandwidth demand associated with sending a second addressable advertisement using the DOCSIS bandwidth for presentation at a third device using a second advertisement spot occurring at a second time during the first time duration, the second time different than the first time;

determining, by the at least one processor, that the first bandwidth demand is below a threshold bandwidth;

determining, by the at least one processor, that the second bandwidth demand exceeds the threshold bandwidth;

sending, by the at least one processor, based on the first bandwidth demand being below the threshold bandwidth, the first addressable advertisement over the DOCSIS bandwidth for presentation at the second device using the first advertisement spot and a first linear segment addressability (LSA) television channel; and determining, by the at least one processor, based on the second bandwidth demand exceeding the threshold bandwidth, a recommendation associated with presentation of the second addressable advertisement at the third device using the second advertisement spot and a second LSA television channel or using a third advertisement spot that occurs at a third time after the second time.

2. The method of claim 1, further comprising:
receiving a first unicast request from the second device, the second device associated with the first advertisement spot; and
receiving a second unicast request from the third device, the third device associated with the second advertisement spot,
wherein determining the first bandwidth demand is based on the first unicast request and a first Internet traffic demand, and
wherein determining the second bandwidth demand is based on the second unicast request and a second Internet traffic demand.

3. The method of claim 1, further comprising receiving audience data indicative of a first viewer at a first geographic location watching the first LSA television channel during the first time duration and a second viewer at a second geographic location watching the second LSA channel during the first time duration.

4. The method of claim 1, further comprising:
determining a third bandwidth demand associated with Internet traffic using the DOCSIS bandwidth during the first time duration;
determining that the third bandwidth demand is below a second threshold bandwidth;
determining, based on the third bandwidth demand being below the second threshold bandwidth, a third threshold bandwidth greater than the threshold demand; and
determining that the second bandwidth demand is below the third threshold bandwidth,
wherein the recommendation is associated with sending, based on the second bandwidth demand being below the third threshold bandwidth, the second addressable advertisement over the DOCSIS bandwidth for presentation at the third device using the second advertisement spot and the second LSA television channel.

5. The method of claim 1, further comprising:
determining a first audience group watching the second LSA television channel at the second time; and
determining that the first audience group comprises a second audience group and a third audience group, the second audience group watching the second LSA television channel at the third time and the third audience group watching the second LSA television channel at a fourth time,
wherein the recommendation is associated with sending the second addressable advertisement over the DOCSIS bandwidth for presentation at the third device at the third time using the second LSA television channel, and
wherein the recommendation is further associated with sending the second addressable advertisement over the DOCSIS bandwidth for presentation at the third device at the fourth time using the second LSA television channel.

6. The method of claim 1, further comprising:
determining a third bandwidth demand associated with sending the second addressable advertisement using the DOCSIS bandwidth for presentation at the third device at the third time using the second LSA television channel; and
determining that the third bandwidth demand is below the threshold bandwidth,
wherein the recommendation is associated with sending the second addressable advertisement over the DOCSIS bandwidth for presentation at the third device using the third advertisement spot and the second LSA television channel.

7. The method of claim 1, further comprising:
determining a first audience group watching the first LSA television channel at the first time, the first audience group comprising a first viewer;
determining a second audience group watching the second LSA television channel at the second time, the second audience group comprising a second viewer; and
determining that the first viewer and the second viewer are associated with only one advertisement stream during the first time duration,
wherein determining the first bandwidth demand is based on the first viewer and the second viewer being associated with only one advertisement stream during the first time duration.

8. The method of claim 1, further comprising:
determining a first audience group watching the first LSA television channel at the first time, the first audience group comprising a first viewer;
determining a second audience group watching the second LSA television channel at the second time, the second audience group comprising the first viewer; and
determining that the first viewer is associated with multiple advertisement streams during the first time duration,
wherein determining the first bandwidth demand is based on the first viewer being associated with multiple advertisement streams during the first time duration.

9. The method of claim 1, further comprising:
determining a first score indicative of a first viewer watching the first LSA television channel at the first time;
determining a second score indicative of a second viewer watching the second LSA television channel at the second time;
determining a first weight indicative of the first LSA television channel being watched; and
determining a second weight indicative of the second LSA television channel being watched,
wherein determining the first bandwidth demand is based on the first score and the first weight, and
wherein determining the second bandwidth demand is based on the second score and the second weight.

10. A system comprising memory coupled to at least one processor, the at least one processor configured to:
determine a first bandwidth demand associated with sending a first addressable advertisement using a data over cable service interface specification (DOCSIS) bandwidth for presentation at a first device using a first advertisement spot occurring at a first time during a first time duration;
determine a second bandwidth demand associated with sending a second addressable advertisement using the DOCSIS bandwidth for presentation at a second device using a second advertisement spot occurring at a second time during the first time duration, the second time different than the first time;

determine that the first bandwidth demand is below a threshold bandwidth;

determine that the second bandwidth demand exceeds the threshold bandwidth;

send, based on the first bandwidth demand being below the threshold bandwidth, the first addressable advertisement over the DOCSIS bandwidth for presentation at the first device using the first advertisement spot and a first linear segment addressability (LSA) television channel; and determine, based on the second bandwidth demand exceeding the threshold bandwidth, a recommendation associated with presentation of the second addressable advertisement at the second device using the second advertisement spot and a second LSA television channel or using a third advertisement spot that occurs at a third time after the second time.

11. The system of claim 10, wherein the at least one processor is further configured to:

receive a first unicast request from the first device, the first device associated with the first advertisement spot; and receive a second unicast request from the second device, the second device associated with the second advertisement spot, wherein to determine the first bandwidth demand is based on the first unicast request and a first Internet traffic demand, and wherein to determine the second bandwidth demand is based on the second unicast request and a second Internet traffic demand.

12. The system of claim 10, wherein the at least one processor is further configured to receive audience data indicative of a first viewer at a first geographic location watching the first LSA television channel during the first time duration and a second viewer at a second geographic location watching the second LSA channel during the first time duration.

13. The system of claim 10, wherein the at least one processor is further configured to:

determine a third bandwidth demand associated with Internet traffic using the DOCSIS bandwidth during the first time duration;

determine that the third bandwidth demand is below a second threshold bandwidth;

determine, based on the third bandwidth demand being below the second threshold demand, a third threshold bandwidth greater than the threshold bandwidth; and determine that the second bandwidth demand is below the third threshold bandwidth, wherein the recommendation is associated with sending, based on the second bandwidth demand being below the third threshold bandwidth, the second addressable advertisement over the DOCSIS bandwidth for presentation at the second device using the second advertisement spot and the second LSA television channel.

14. The system of claim 10, wherein the at least one processor is further configured to:

determine a first audience group watching the second LSA television channel at the second time; and determine that the first audience group comprises a second audience group and a third audience group, the second audience group watching the second LSA television channel at the third time and the third audience group watching the second LSA television channel at a fourth time, wherein the recommendation is associated with sending the second addressable advertisement over the DOC-SIS bandwidth for presentation at the second device at the third time using the second LSA television channel, and wherein the recommendation is further associated with sending the second addressable advertisement over the DOCSIS bandwidth for presentation at the second device at the fourth time using the second LSA television channel.

15. The system of claim 10, wherein the at least one processor is further configured to:

determine a third bandwidth demand associated with sending the second addressable advertisement using the DOCSIS bandwidth for presentation at the second device at the third time using the second LSA television channel; and determine that the third bandwidth demand is below the threshold bandwidth, wherein the recommendation is associated with sending the second addressable advertisement over the DOC-SIS bandwidth for presentation at the second device using the third advertisement spot and the second LSA television channel.

16. The system of claim 10, wherein the at least one processor is further configured to:

determine a first audience group watching the first LSA television channel at the first time, the first audience group comprising a first viewer;

determine a second audience group watching the second LSA television channel at the second time, the second audience group comprising a second viewer; and determine that the first viewer and the second viewer are associated with only one advertisement stream during the first time duration, wherein to determine the first bandwidth demand is based on the first viewer and the second viewer being associated with only one advertisement stream during the first time duration.

17. The system of claim 10, wherein the at least one processor is further configured to:

determine a first audience group watching the first LSA television channel at the first time, the first audience group comprising a first viewer;

determine a second audience group watching the second LSA television channel at the second time, the second audience group comprising the first viewer; and determine that the first viewer is associated with multiple advertisement streams during the first time duration, wherein to determine the first bandwidth demand is based on the first viewer being associated with multiple advertisement streams during the first time duration.

18. A non-transitory computer-readable medium storing computer-executable instructions which when executed by one or more processors result in performing operations comprising:

determining, by a first device, a first bandwidth demand associated with sending a first addressable advertisement using a data over cable service interface specification (DOCSIS) bandwidth for presentation at a second device using a first advertisement spot occurring at a first time during a first time duration;

determining, by the first device, a second bandwidth demand associated with sending a second addressable advertisement using the DOCSIS bandwidth for presentation at a third device using a second advertisement spot occurring at a second time during the first time duration, the second time different than the first time;

determining that the first bandwidth demand is below a threshold bandwidth;

determining that the second bandwidth demand exceeds the threshold bandwidth;

sending, based on the first bandwidth demand being below the threshold bandwidth, the first addressable advertisement over the DOCSIS bandwidth for presentation at the second device using the first advertisement spot and a first linear segment addressability (LSA) television channel; and determining, based on the second bandwidth demand exceeding the threshold bandwidth, a recommendation associated with presentation of the second addressable advertisement at the third device using the second advertisement spot and a second LSA television channel or using a third advertisement spot that occurs at a third time after the second time.

19. The non-transitory computer-readable medium of claim 18, the operations further comprising:

receiving a first unicast request from the second device, the second device associated with the first advertisement spot; and receiving a second unicast request from the third device, the third device associated with the second advertisement spot, wherein determining the first bandwidth demand is based on the first unicast request and a first Internet traffic demand, and wherein determining the second bandwidth demand is based on the second unicast request and a second Internet traffic demand.

20. The non-transitory computer-readable medium of claim 18, the operations further comprising receiving audience data indicative of a first viewer at a first geographic location watching the first LSA television channel during the first time duration and a second viewer at a second geographic location watching the second LSA channel during the first time duration.

* * * * *